R. R. LEWIS & J. H. CRUMB.
Apparatus for Smoking Meat.
No. 208,185. Patented Sept. 17, 1878
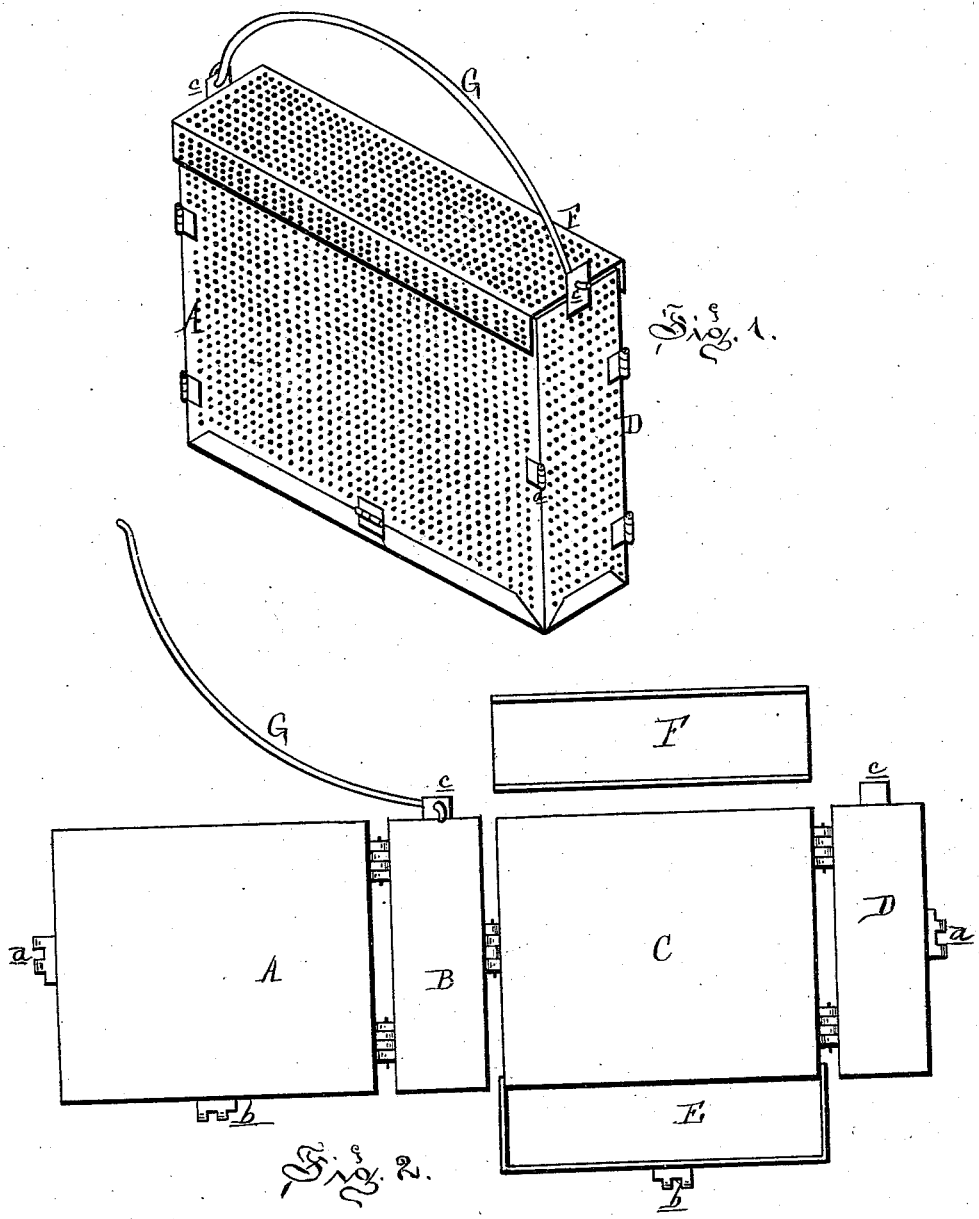

UNITED STATES PATENT OFFICE.

RUSSELL R. LEWIS AND JOSEPH H. CRUMB, OF DE RUYTER, NEW YORK.

IMPROVEMENT IN APPARATUS FOR SMOKING MEAT.

Specification forming part of Letters Patent No. 208,185, dated September 17, 1878; application filed February 7, 1878.

*To all whom it may concern:*

Be it known that we, RUSSELL R. LEWIS and JOSEPH H. CRUMB, of De Ruyter, in the county of Madison and State of New York, have invented an Improvement in Boxes for Drying and Smoking Beef or other Meats, of which the following is a specification:

Our invention relates to certain new and useful improvements in boxes for drying and smoking minced meat, into which the finely-divided meat can be pressed, and after being dried and smoked can be removed therefrom in a solid cake; and it consists in constructing a perforated box having a suspending-bail, by which it can be hung in the smoke-chamber, with its sides and ends hinged together, so that it can be opened to allow the minced meat to be removed in a solid cake after being smoked.

The manner of using this box is as follows: All the meat is stripped from the carcass, the fat all removed, and the lean meat chopped fine by any convenient means. The top being removed from the box, the latter is filled with the minced meat, being subjected to pressure until the interior of the box is filled with a solid cake of minced meat. The cover is replaced and the box with its contents is suspended in the smoke-house. All sides of the box being perforated, the smoke acts directly upon the minced meat. When sufficiently dried and smoked the box is removed, the top and bottom taken off, the sides and ends of the box opened out flat, and the contents removed to be thinly sliced off for use.

If to be kept any length of time or to be shipped to market, the cake should be inclosed in canvas or paper sacks, in the usual way, to protect it from insects.

By this process we are able to utilize the entire meat of the carcass, and make it as valuable as any of the smoked meats of the kinds usually found in the market.

Figure 1 is a perspective view of our perforated smoke-box. Fig. 2 is a plan view of the same unfolded.

In the drawings, A represents the front of the box, hinged to the end B, which, in turn, is hinged to the back C, and this is hinged to the end D, which is secured to the front A by the clip $a$, through which is passed a rod. Similar clips $b$ removably secure the bottom E to the front A and back C.

F is a cover. The ends B D terminate in ears $c$, with which the suspending-bail G engages.

All the parts of this box are preferably made of perforated metallic plates; but any other suitable perforated material, such as wood, might be used.

Before being placed in the box, salt, pepper, and any kind of spice may be added and mixed with the minced meat, if desired.

What we claim as our invention, and desire to secure by Letters Patent, is—

A perforated smoke-box, the sides and ends of which are hinged together and provided with removable top and bottom and suspending-bail, constructed to operate as and for the purposes described.

RUSSELL R. LEWIS.
J. H. CRUMB.

Witnesses:
J. P. RUSSELL,
DELL. H. RUSSELL.